United States Patent [19]

Kaupert

[11] Patent Number: 4,653,219
[45] Date of Patent: Mar. 31, 1987

[54] FISHING LINE ASSEMBLY

[76] Inventor: Andreas P. Kaupert, 39119 Deerhorn Rd., Springfield, Oreg. 97478

[21] Appl. No.: 746,379

[22] Filed: Jun. 19, 1985

[51] Int. Cl.$^4$ ............................................. A01K 91/00
[52] U.S. Cl. ..................................... 43/43.1; 114/311
[58] Field of Search ...................... 43/6, 43.1; 114/311

[56] References Cited

U.S. PATENT DOCUMENTS

| | | | |
|---|---|---|---|
| 289,224 | 11/1883 | Clarke | 114/311 |
| 2,768,467 | 10/1956 | Radune | 43/43.1 |
| 3,039,419 | 6/1962 | Rimar | 43/6 |
| 3,715,828 | 2/1973 | Johnson | 43/6 |
| 3,973,236 | 8/1976 | McLaughlin | 114/311 |

FOREIGN PATENT DOCUMENTS 15699 of 1890 United Kingdom ................ 114/311

Primary Examiner—Gene P. Crosby
Attorney, Agent, or Firm—John J. Posta, Jr.

[57] ABSTRACT

The assembly includes a fishing line having a hook, lure or other fish-securing device adjacent its free end, and a fish drag in the form of a collapsible or foldable, umbrella-like water scoop secured to the line, with the openable end thereof facing the fish-securing device. The scoop may be a ribbed umbrella fabric with its apex fixed to the line and with support struts connected to a slide ring adjacent the open end of the scoop. When the line is trolled, the scoop is folded or collapsed. When a fish strikes the lure or hook pulls the line the opposite direction, the scoop is opened. In another embodiment the scoop can be plurality of interconnected plates hingedly connected to the apex which is fixed to or slideably secured over the line. A lock block, preferably bearing primary or secondary hooks and/or lures, releasably holds the scoop plates in the collapsed position until a fish strikes. The drag quickly tires a fish to facilitate its rapid recovery. The assembly is simple, durable and efficient.

11 Claims, 4 Drawing Figures

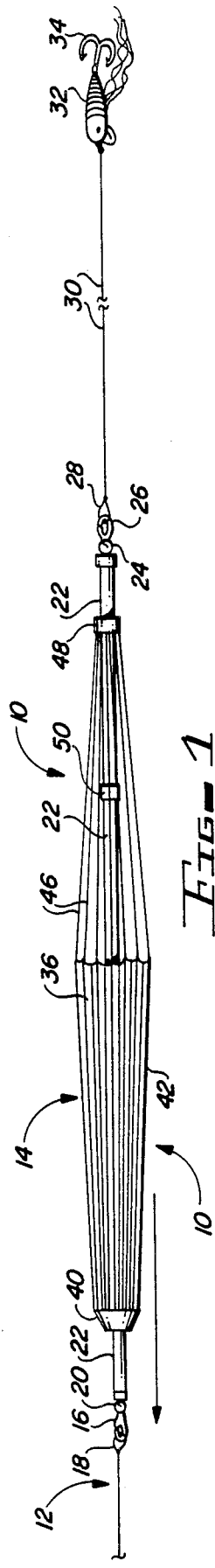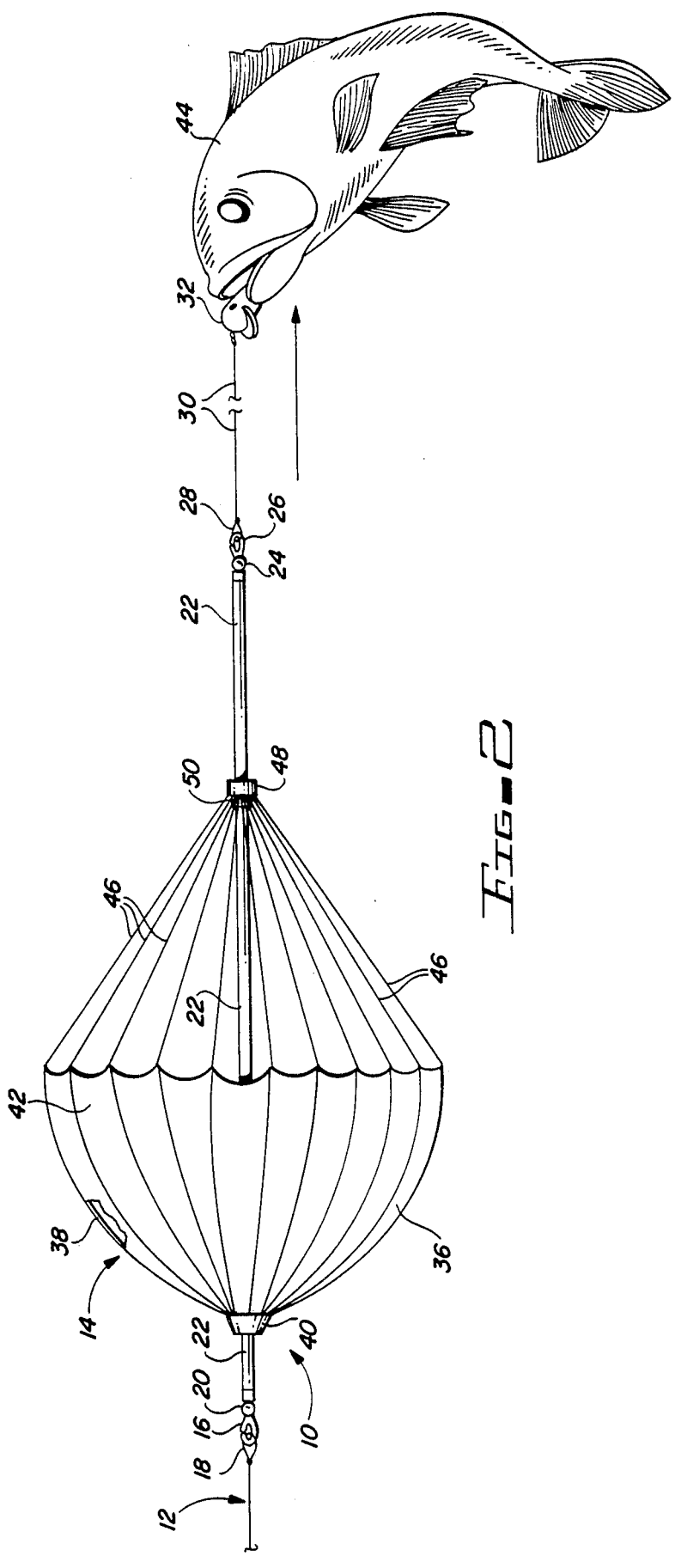

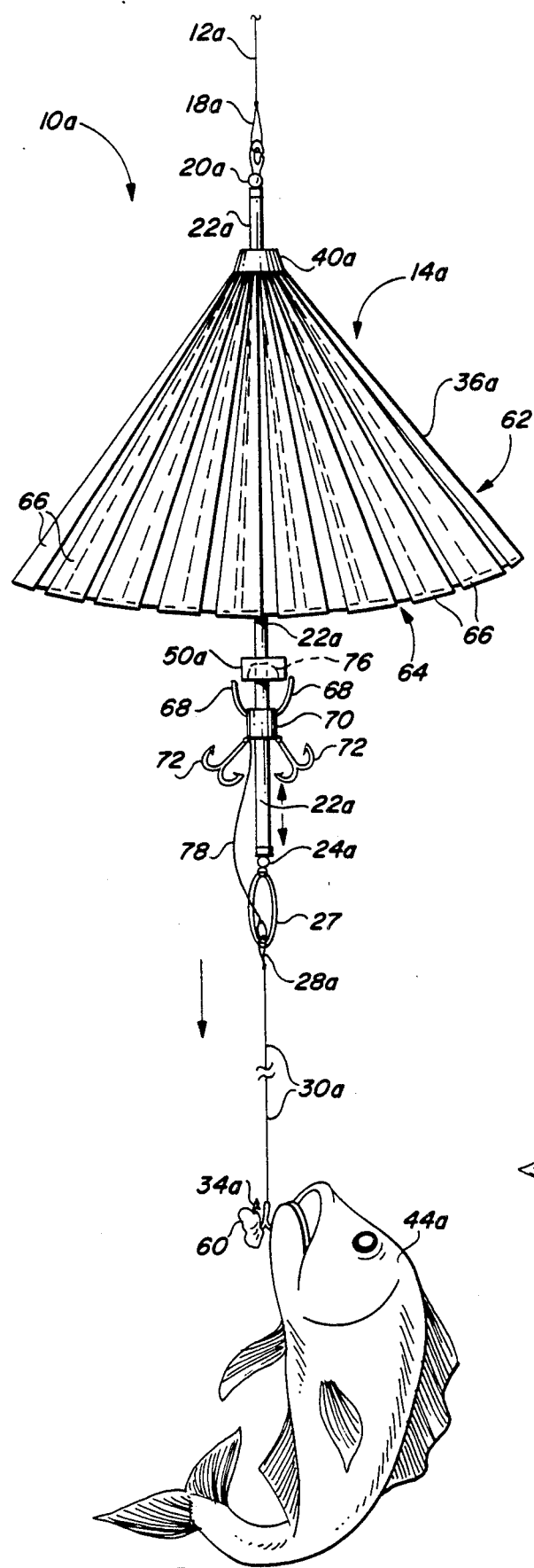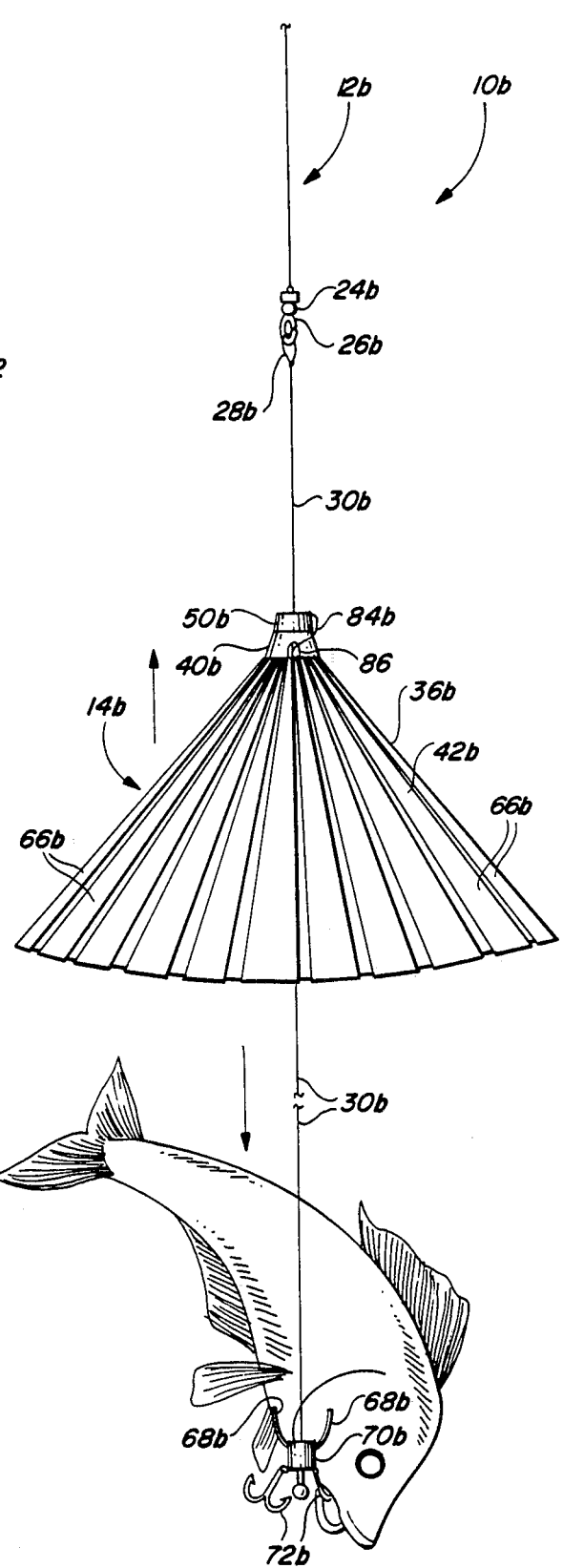

FISHING LINE ASSEMBLY

BACKGROUND OF THE INVENTION

1. Field Of The Invention

The present invention generally relates to fishing means and, more particularly, to an improved fishing line assembly.

2. Prior Art

Various types of devices have been devised to facilitate rapid recovery of fish during fishing. Some involve special weighted leaders, and/or barbed lures and the like. Most depend on the combined weight of the line, leaders, sinkers, hooks and lures, as well as the activity of the fisherman, in reeling the line and playing the fish to gradually tire a fish hooked on the line in order to be able to recover it. The heavier that combined weight, the larger is the amount of energy that the fisherman must exert to land the fish. In many cases, the landing of a large fish is a time-consuming, very tiring process. Moreover, heavy leaders, sinkers and lures put a considerable strain on the line fishing pole and reel, so that they must be made extra strong or be frequently replaced.

Accordingly, there is a need for an improved device which will facilitate more rapid recovery of a hooked fish and will reduce the wear and tear on the fisherman, line fishing pole and reel, as well as reducing the need for heavy duty fishing equipment.

SUMMARY OF THE INVENTION

The improved fishing line assembly of the present invention satisfies all the foregoing needs. The assembly is substantially as set forth in the Abstract above. Thus, it includes a fishing line having a hook, lure or other fish-securing means on its free end and a fish drag secured to line. The drag is a water scoop which is generally umbrella shaped, with its open end facing the fish-securing means. The water scoop in one embodiment can comprise a plurality of collapsible ribs attached to a fixed apex and to a flexible foldable skin of cloth fabric, metal foil, plastic or the like, and supported by guy wires attached to a slide ring on the open end of the scoop.

Trolling the line collapses (folds) the scoop shut. However, when a fish strikes and pull the line in the opposite direction, the scoop automatically opens and exerts considerable drag on the fish, tiring it until it can be recovered.

In another embodiment, the scoop comprises one or more layers of interconnected collapsible (foldable) plates releasably held shut by the fingers of a lock block. When a fish strikes the line, the force is sufficient to separate the lock block fingers from the plates to allow the scoop to automatically open and exert heavy drag on the fish. The scoop apex can be fixed to the line or the scoop can slide between a fixed lock block and a fixed stop block when released from the lock block. The stop block can include an arm to hold the apex of the scoop in place after such release, to keep it from the fish on the line. The lock block can carry one or more hooks and/or lures in place of or in addition to those on the free end of the line.

The device is simple, inexpensive, durable and effective to greatly reduce fish recovery time, and wear and tear on the fisherman and his equipment. Further features of the invention are set forth in the following detailed description and accompanying drawings.

DRAWINGS

FIG. 1 is a fragmentary, schematic side elevation of a first preferred embodiment of the improved fishing line assembly of the present invention, shown with the assembly in the trolling position, with the water scoop thereof closed;

FIG. 2 is a fragmentary, schematic side elevation of the assembly of FIG. 1, shown with the scoop thereof in the open fish drag position and with a fish hooked on the line;

FIG. 3 is a fragmentary, schematic side elevation of a second preferred embodiment of the improved fishing line assembly of the present invention, shown with a fish hooked on the line and with the water scoop thereof in the open fish drag position; and, FIG. 4 is a fragmentary, schematic side elevation, of a third preferred embodiment of the improved fishing line assembly of the present invention, shown with a fish hooked on the line and with the water scoop thereof in the open fish drag position.

DETAILED DESCRIPTION

FIGS. 1-2.

A first preferred embodiment of the improved fishing line assembly of the present invention is schematically depicted in FIGS. 1 and 2. Thus, assembly 10 is shown. FIG. 1 depicts assembly 10 in the line-casting or trolling non-drag position, with the line moving in the direction of the arrow. FIG. 2 shows assembly 10 in the fish drag position, with a fish hooked on the line and the fish pulling the line in the direction of the arrow.

Assembly 10 comprises a fishing line 12 and fish drag 14 connected thereto. Line 12 may include a snap 16 connected to a loop 18 in line 12 and to a first swivel 20, in turn connected to an elongated shaft or rod 22 forming part of drag 14. Rod 22 is also connected to a second swivel 24 bearing a snap 26 releasably secured to the loop 28 of a leader 30 bearing a lure 32 with hooks 34 on the free end of line 12. Thus, fish drag 14 can be easily connected to and separated from line 12.

Fish drag 14 comprises an umbrella-like water scoop 36 formed of a plurality of foldable or collapsible flexible resilient ribs 38 of metal, plastic, wood or the like secured to a fixture comprising the apex 40 of scoop 36 in turn secured to rod 22. Ribs 38 diverge from apex 40 toward lure 32. Ribs 38 are secured to and covered by a flexible, resilient, foldable, water-resistant fabric 42 of cloth, rubber, metal foil, thin plastic or the like so that in the open position (FIG. 2) scoop 36 has the desired generally open umbrella-like configuration which permits it to exert heavy drag on a fish 44 on line 12 (FIG. 2).

In order to strengthen scoop 36, ribs 38 are connected to guy lines or support struts 46, which in turn are connected to a slide ring 48 disposed around rod 22. Rod 22 has a stop block 50 fixedly secured thereto in the path of ring 48 to prevent excessive opening of scoop 36.

When assembly 10 is attached to a fishing pole or the like and cast from the shore or a boat, it has the configuration shown in FIG. 1 and exerts little water drag, scoop 36 being closed around rod 22 (collapsed). Line 12 can be easily trolled or recast with scoop 36 in this closed position, it remaining in this low drag position until fish 44 strikes lure 32 and pulls line 12 in the opposite direction (FIG. 2), thus causing scoop 36 to automatically fully deploy. In the full open position, scoop 36 exerts a large drag force on fish 44, tiring it very rapidly. When fish 44 becomes tired, it can then be easily reeled in with line 12, scoop 36 then automatically closing (FIG. 1) and exerting little or no water drag. Thus, assembly 10 can be made of materials which are light in weight, inexpensive, durable and effective for an improved ease and speed of recovering hooked fish.

FIG. 3

A second preferred embodiment of the improved fishing line assembly of the present invention is schematically depicted in FIG. 3. Thus, assembly 10a is shown. Components thereof similar to those of assembly 10 bear the same numerals, but are succeeded by the letter "a". Assembly 10a includes 12a and fish drag 14a. Line 12a includes snap 16a, swivels 20a and 24a, loops 18a and 28a, leader 30a, and end hooks 34a bearing bait 60. No separate lure is provided. Longitudinally extendable spring extension member 27 connects loop 28a to swivel 24a.

Fish drag 14a is fixedly connected to a base member in the form of a rod 22a, which is in turn connected to swivels 20a and 24a. Fish drag 14a comprises an umbrella-shaped water scoop 36a formed of two overlapping interconnected sets 62 and 64 of slats or plates 66 hingedly secured to a fixture comprising apex 40a fixedly secured to rod 22a, and downwardly diverging from apex 40a. Set 62 overlies, overlaps and is connected to set 64 to form therewith a continuous readily foldable self-supporting canopy 42a.

Plates 66 are releasably secured in the fully folded position by the spring arms 68 of a lock block 70 slideably secured over rod 22a and bearing hooks 72. Block 70 has a tapered head lightly frictionally received in a configured recess 76 in a stop block 50a fixedly secured to rod 22a. A separate lead 78 runs from block 70 to loop 28a. When a fish 44a strikes bait 60 on hooks 34a, member 27 is deformed and longitudinally extended, thereby pulling block 70 from recess 76, causing spring arms 68 to move downwards and release plates 66 and effect immediate and full deployment of scoop 36a to the full fish drag position of FIG. 3. If a fish strikes hooks 72, deployment will likewise be effected. Other and different release mechanisms can readily be employed without departing from the scope of the invention. Assembly 10a in other respects performs identically to assembly 10 and has the advantages thereof.

FIG. 4

A third preferred embodiment of the improved fishing line assembly of the present invention is schematically depicted in FIG. 4. Thus, assembly 10b is shown. Components thereof similar to those of assembly 10 or 10a bear the same numerals, but are succeeded by the letter "b". Assembly 10b is identical to assembly 10a, except that in the following respects. Scoop 36b of drag 14b includes a canopy 42b in the form of a single sheet of self-supporting pleated or folded flexible plastic, stiffened fabric or the like hingedly connected to a fixture forming apex 40b which in turn is slideably disposed around leader 30b of line 12b, no rod comparable to rod 22 or 22a being present. A base member in the form of a leader 30b is releasably connected to the remainder of line 12b by swivel 24b of snap 26b.

Block 70b is secured at the free end of leader 30b and bears hooks 72b, to one of which fish 44b is shown in FIG. 4 to be secured. Block 70b includes spring arms 68b for releasably holding canopy 42b in the collapsed closed position. When fish strikes hooks 72 by arms 68b are shaken from canopy 42b and scoop 36b immediately deploys open to the position of FIG. 4 and slides toward stop block 50b. Block 50b bears spring arm 84 which passes into recess 86 in apex 40b when apex 40b slides into contact with block 50b, thus locking scoop 36b up out of the way of fish 44b. Therefore, later when it is time to reel tired fish 44b in, scoop 36b will not slide into contact therewith and interefere with the recovery operation or be damaged. In all other respects, assembly 10b functions similarly to and has the advantages of assembly 10a.

Various other modifications, changes, alterations and additions can be made in the improved fishing line assembly of the present invention, its components and their parameters. For example, the drag 14 can be painted in various colors to resemble bait fish or can be painted bright colors to attract fish to the area, in the nature of a fish "flasher". Alternatively, a camouflage member can be disposed over the drag 14 to hide it, such member being shaped and colored to resemble bait such as an anchovy or squid. If desired, hooks can be secured to the drag 14.

Additionally, a plurality of drags 14 can be readily disposed in parallel or in series along the length of the fishing line 12, with means to successfully or simultaneously release and deploy one or more of same, depending upon the pulling force of the hooked fish. All such changes, modifications, alterations and additions as are within the scope of the appended claims form part of the present invention.

What is claimed is:

1. An improved fishing line assembly comprising, in combination:
    (a) a fishing line, a fish drag, and fish-securing means connected adjacent to one line end of said assembly;
    (b) said fish drag connected to said fishing line and comprising a collapsible water scoop mounted upon a base member and an openable end facing said fish-securing means,
    (c) scoop securing means for maintaining said scoop in a collapsed position unless and until said scoop is moved in water sharply in a direction of said one line end, and
    (d) said scoop securing means being inseparably attached to said base member and being overcome to automatically release said scoop and allow said scoop to be automatically opened when moved in water sharply in a direction toward said one line end and said scoop being automatically collapsed when moved in the opposite direction.

2. The improved fishing line assembly of claim 1 wherein said scoop has an umbrella-like shape with the apex attached to said base member thereof at the end thereof away from said one line end.

3. the improved fishing line assembly of claim 2 wherein said base member of said scoop includes a central longitudinal support rod and wherein said apex is fixedly secured to said rod.

4. The improved fishing line assembly of claim 1 wherein said fish drag is rotatably secured to said line and wherein said fish-securing means includes at least one of hooks and lures.

5. The improved fishing line assembly of claim 3 wherein said scoop includes a plurality of spaced diverging foldable plates hingedly connected to said apex and wherein said scoop securing means are disposed on said rod for releasably securing said plates in a closed, folded position against said rod.

6. The improved fishing line asembly of claim 5 wherein said scoop-securing means comprises a stop block fixedly secured to said rod between said scoop and said one line end, and a lock block slideably disposed on said rod between said stop block and said one line end and friction fitted into said stop block, being separable therefrom when a fish strikes said fish-securing means, said lock block including spaced flexible arms releasably holding said plates in said closed folded condition.

7. The improved fishing line assembly of claim 6 wherein said lock block bears at least some of said fish-securing means and wherein there are two sets of said plates, one said set overlapping the other of said sets.

8. The improved fish line assembly of claim 6 wherein said fish drag includes spring means stretchable when a fish strikes said fish-securing means and wherein said lock block is connected to said spring means for movement therewith, said movement effecting opening of said scoop.

9. The improved fish line assembly of claim 8 wherein said fish-securing means are also disposed at said lock block.

10. The improved fish line assembly of claim 1 wherein said scoop is slideably disposed on said base member between a stop block remote from said one line end and a lock block adjacent said one line end, said stop block and lock block being fixedly secured to said line, said lock block bearing said fish-securing means.

11. The improved fishing line assembly of claim 10 wherein said scoop includes a unitary canopy formed of a single sheet of foldable flexible material connected to said apex and diverging outwardly therefrom to provide said umbrella-like shape, and wherein said lock block includes spaced flexible arms releasably holding said canopy in a fully folded position, but dislodgeable from said canopy when a fish strikes said fish-securing means, whereby said scoop opens and slides to said stop block.

* * * * *